(12) United States Patent
Dubuet et al.

(10) Patent No.: US 11,927,824 B2
(45) Date of Patent: Mar. 12, 2024

(54) ARRAY OF TUBES FOR OPTICAL CABLES

(71) Applicant: NEXANS, Courbevoie (FR)

(72) Inventors: Eloïse Dubuet, Paris (FR); Thomas Hähner, Verrieres le Buisson (FR)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 17/560,649

(22) Filed: Dec. 23, 2021

(65) Prior Publication Data
US 2022/0252819 A1    Aug. 11, 2022

(30) Foreign Application Priority Data
Dec. 23, 2020   (FR) ...................... 20 14106

(51) Int. Cl.
    *G02B 6/50*    (2006.01)
    *G02B 6/44*    (2006.01)

(52) U.S. Cl.
    CPC ............... *G02B 6/50* (2013.01); *G02B 6/443* (2013.01)

(58) Field of Classification Search
    CPC .......... G02B 6/50; G02B 6/502; G02B 6/504; G02B 6/506; H02G 9/06
    See application file for complete search history.

(56) References Cited

U.S. PATENT DOCUMENTS

| | | | | |
|---|---|---|---|---|
| 4,595,793 A * | 6/1986 | Arroyo | ................... | H01B 7/295 156/53 |
| 4,892,442 A * | 1/1990 | Shoffner | ................... | H02G 1/08 264/171.27 |
| 6,262,371 B1 * | 7/2001 | Allen | ................... | H02G 9/06 138/116 |
| 6,364,290 B1 * | 4/2002 | Barker | ................. | G02B 6/4464 254/134.4 |
| 6,540,208 B1 * | 4/2003 | Pecot | ................... | G02B 6/4463 254/134.3 R |
| 6,912,347 B2 * | 6/2005 | Rossi | ................... | G02B 6/4438 385/112 |
| 7,182,104 B2 * | 2/2007 | Washburn | ................ | G02B 6/50 138/119 |
| 2003/0035635 A1 * | 2/2003 | Chastain | .............. | G02B 6/4401 385/103 |
| 2004/0208463 A1 | 10/2004 | Park | | |
| 2005/0194578 A1 * | 9/2005 | Morris | ................... | D02G 3/185 254/134.3 FT |
| 2006/0018611 A1 | 1/2006 | Maida, Jr. | | |
| 2007/0183726 A1 | 8/2007 | Nothofer et al. | | |
| 2020/0158972 A1 | 5/2020 | Koshinz | | |
| 2021/0003801 A1 | 1/2021 | Ott | | |

FOREIGN PATENT DOCUMENTS

| | | | | |
|---|---|---|---|---|
| EP | 2031719 A1 * | 3/2009 | ............. | G02B 6/387 |
| FR | 2931254 A1 * | 11/2009 | ............... | G02B 6/50 |
| JP | 2006235263 A * | 9/2006 | | |

OTHER PUBLICATIONS

JP 2006235263 A English translation (Year: 2006).*
FR 2931254 A1 English translation (Year: 2009).*
International Search Report dated Sep. 6, 2021.
International Search Report dated Oct. 7, 2021.

\* cited by examiner

*Primary Examiner* — Charlie Y Peng
(74) *Attorney, Agent, or Firm* — Sofer & Haroun, LLP

(57) ABSTRACT

An assembly having a tube and at least one optical cable with the optical cable being placed inside the tube. The tube has an inner diameter D and in that the optical cable has an outer diameter d, the ratio d/D ranging from 0.10 to 0.80.

8 Claims, 2 Drawing Sheets

ARRAY OF TUBES FOR OPTICAL CABLES

RELATED APPLICATION

This application claims the benefit of priority from French Patent Application No. 20 14106, filed on Dec. 23, 2020, the entirety of which is incorporated by reference.

FIELD OF THE INVENTION

The present invention relates to an assembly comprising a tube and at least one optical cable and an array comprising one or more assemblies.

DESCRIPTION OF PRIOR ART

Optical fibre is increasingly used for the transmission of information, notably in the telecommunication sector or in computer networks. Optical fibres are generally installed in fibreoptic cables or optical cables that can comprise one to several tens of optical fibres depending on the requirements.

The optical cables are generally installed in tubes or microtubes that can vary depending on the type of optical cables that they have to contain and above all depending on the place in which the tube is intended to be installed (outside, underground, vehicle, etc.). The installing of an optical cable in a tube is generally performed by blowing or by pushing the optical cable in the tube.

The document EP1818703 describes optical cables comprising a plurality of optical fibres surrounded by a protective tube. The optical cables are then each placed in a microconduit then several microconduits are themselves placed inside a conduit that can then be installed in the desired location.

Such an array thus comprises different protective elements for the optical fibres, namely the tubes, the microconduits and the conduits. However, this array presents the drawback of being heavy and bulky because of the significant number of protective elements compared to the number of optical fibres that it contains. This type of array cannot therefore used in certain areas such as aeronautics.

In fact, in the aeronautical sector, the optical cables and the tubes must address certain constraints and notably have good mechanical strength, good resistance to fire and to extreme temperature and pressure conditions, and do so while forming a lightweight and compact array. Moreover, in order to facilitate their maintenance, the optical cables must be able to be easily installed and replaced.

OBJECTS AND SUMMARY

The aim of the present invention is therefore to develop an assembly comprising a tube and at least one optical fibre and that makes it possible to overcome at least one of the abovementioned drawbacks.

A first subject of the present invention is an assembly comprising a tube and at least one optical cable, said optical cable being placed inside said tube, the assembly being characterized in that the tube has an inner diameter D and in that the optical cable has an outer diameter d, the ratio d/D ranging from 0.10 to 0.80, preferably from 0.20 to 0.65, preferably from 0.25 to 0.55, and even more preferably from 0.30 to 0.45.

The assembly of the invention has an optimized ratio d/D and therefore has reduced volume and weight allowing it to be used in places where space is limited, such as, for example, in the area of aeronautics.

Moreover, the diameter of the tube is large enough, compared to that of the optical cable, for the latter to be able to be slid into the tube during its installation and/or de-installation, and small enough to avoid any bending or twisting of the optical cable when the latter is slid into the tube.

Thus, the assembly of the invention allows for easier installation and maintenance of the optical cables. For example, tubes can be installed in the desired place and the optical cables can be added or removed when necessary while leaving the tubes in place. On the other hand, in the devices of the prior art, the optical cables are placed in cable looms and all of the cables have to be dismantled in order to work on or install one cable.

The assembly of the invention thus offers great installation flexibility.

Inside the tube, the optical cables can be identical or different and are surrounded by air.

According to one possible embodiment, the tube can have an inner surface having a static friction coefficient $\mu s1$ and the optical cable can have an outer surface having a static friction coefficient $\mu s2$, the difference between $\mu s1$ and $\mu s2$ having an absolute value ranging from 0.05 to 0.70, preferably ranging from 0.05 to 0.50, and even more preferably ranging from 0.05 to 0.30. It is thus possible to insert an optical cable inside the tube and to begin to slip it in for its installation while encountering only a small degree of resistance from the inner surface of the tube. The optical cable can thus be inserted without experiencing mechanical strain (resistance, bending, twisting, etc.) and thus without the risk of being damaged. Likewise, the optical cable can be removed from the tube without being damaged.

According to one possible embodiment, the tube can have an inner surface having a dynamic friction coefficient $\mu d1$ and the optical cable can have an outer surface having a dynamic friction coefficient $\mu d2$, the difference between pd1 and $\mu d2$ having an absolute value ranging from 0.05 to 0.70, preferably ranging from 0.05 to 0.50, and even more preferably ranging from 0.05 to 0.30. Since this dynamic friction coefficient is low, it is possible to push the optical cable inside the tube or, on the other hand, remove it without it being folded or twisted. The optical cable can for example be pushed to a length that can range up to 25 metres (m), even if the tube includes curved zones or elbows.

The Tube

The inner diameter D of the tube can have a value ranging from 1 millimetre (mm) to 8 mm, preferably from 2 mm to 6 mm, particularly preferably from 2.5 mm to 4 mm.

Such a diameter allows the tube to accommodate, in its internal space, a number of optical cables that can range from 1 to 50. The number of optical cables that can be inserted into a tube can depend notably on the type of optical cables, on the desired use of the optical cables, on the diameter d of each cable possibly present in the tube, and/or on the diameter of the optical cable that is wanted to be added.

The assembly of the tube and of the optical cables inserted inside the tube is thus optimized since it allows a high enough number of optical cables to be housed in a tube of limited bulk.

The tube can have a thickness ranging from 0.10 mm to 1.50 mm, preferably from 0.15 mm to 1.30 mm and particularly preferably from 0.20 mm to 1.00 mm. In this way, the tube is thick enough to be able to protect the optical cables and thin enough not to be too bulky. The thickness ranges of the tube also allow the tube to be able to be manufactured by extrusion when it is formed in a polymer material.

The tube can have a totally rectilinear form or can be rectilinear over certain portions and include bends and/or elbows on other portions. The bends can preferably have a radius of curvature of at least 10 mm, preferably at least 15 mm, and particularly preferably of at least 18 mm.

The tube can also have various features described hereinbelow that allow it to meet certain constraints.

According to a possible feature, the tube can have a Young's modulus ranging from 450 MPa to 700 MPa, preferably ranging from 470 MPa to 620 MPa, and particularly preferably, from 500 MPa to 590 MPa. The tube thus has an optimized longitudinal elasticity and can withstand high tensile stresses. The optical cables placed inside the tube can then be protected from the mechanical stresses exerted on the tube. It is thus possible to insert enhanced optical cables which comprise fewer protection elements and which are more lightweight, which is not possible with the tubes known from the prior art.

According to another possible feature, the tube may be resistant to impacts that it may receive, the force of these impacts possibly ranging up to 1000 N, preferably up to 750 N, and even more preferably up to 500 N. In particular, the tube exhibits no breakage or deformation following such an impact and the optical cables present inside the tube are thus protected from the mechanical stresses which are applied to the tube. In particular, when the tube receives an impact as previously described, the optical cable or cables present inside the tube exhibit little or no attenuation of their signal, notably a signal attenuation of at most 0.3 dB, preferably at most 0.2 dB, and even more preferably of at most 0.1 dB.

According to a preferred embodiment, the tube can meet crush resistance standard EN 3745-513.

The tube can comprise a main layer comprising at least one first polymer material. The first polymer material can comprise at least one polymer chosen from among a polymer of olefin, an elastomer ethylene-propylene (EPM) copolymer, an ethylene propylene diene monomer (EPDM) terpolymer, a copolymer of ethylene and of vinyl ester, a copolymer of ethylene and of acrylate, a copolymer of ethylene and of alpha-olefin, a fluorinated polymer, a polyimide, and one of the mixtures thereof, said polymers being able to be linear or branched.

According to a preferred embodiment, the first polymer material can comprise at least one polymer of polyimide that can be linear, branched, and/or aromatic and that can be chosen from among the polyetherimides, the polyamideimides, the copolymers of polyetherimide-siloxanes, and one of the mixtures thereof.

The first polymer material can comprise at least 50% by weight of polymer, preferably at least 70% by weight of polymer, even more preferably at least 80% by weight of polymer, and even more preferably at least 90% by weight of polymer.

According to a preferred embodiment, the tube can comprise an inner layer comprising at least one second polymer material different from the first polymer material, said inner layer being surrounded by the main layer. Preferably, the inner layer is the layer which is in contact with the optical cables and the difference of the static and/or dynamic friction coefficient between the surface of the inner layer which is in contact with the optical cable or cables and the outer surface of the optical cable or cables is as previously described. According to this embodiment, the main layer is not in contact with the optical cables placed inside the tube and it can therefore serve essentially as mechanical protection for the optical cables.

In the case where the tube does not comprise an inner layer, the main layer is in contact with the optical cable or cables placed inside the tube and the difference in static and/or dynamic friction coefficient between the inner surface of the main layer and the outer surface of the optical cable or cables is as previously described.

According to this embodiment, the second polymer material can preferably comprise at least one fluorinated polymer chosen from among the copolymers obtained from tetrafluoroethylene monomer, and in particular from among polytetrafluoroethylene (PTFE); the copolymers of fluorinated ethylene and propylene (FEP) such as, for example, poly(tetrafluoroethylene-co-hexafluoro-propylene); the perfluoroalkoxy (PFA) copolymers such as, for example perfluoro(alkylvinylether)/tetrafluoroethylene copolymers; the perfluoro methoxy (MFA) copolymers; and poly(ethylene-co-tetrafluoroethylene) (ETFE); and one of the mixtures thereof. The fluorinated polymers notably allow the inner layer to have static and dynamic friction coefficient values that are low enough to allow the optical cables to slip inside the tube.

The second polymer material can comprise at least 50% by weight of polymer, preferably at least 70% by weight of polymer, even more preferably at least 80% by weight of polymer, and even more preferably at least 90% by weight of polymer.

According to one embodiment, the main layer of the tube and/or the inner layer can conventionally comprise additional agents such as, for example, fillers, pigments, crosslinking agents, fireproofing fillers, etc.

According to a preferred embodiment, the tube is manufactured by extrusion. In the case where the tube comprises a main layer and an inner layer, said main and inner layers can be co-extruded.

According to another possible embodiment, the tube can comprise one or more additional layers, preferably placed around the main layer and/or between the inner layer and the main layer. The additional layers can comprise a mechanical reinforcement layer, for example made of glass fibre/polymer composite material, a bond layer between the main layer and the inner layer, or even a lubricating layer placed inside the tube to promote the slipping of the optical cable inside the tube.

The Optical Cable

All types of optical cable can be used in the assembly according to the invention. When the assembly comprises several optical cables placed in the tube, these optical cables can be identical or different.

The optical cable can comprise a central part comprising one or more optical fibres, the central part being surrounded by a protective jacket.

The protective jacket can comprise a protective sheath which makes it possible to mechanically protect the optical fibres contained in the central part, notably against compression and twisting forces and/or impacts that may be exerted on the optical cable.

According to one embodiment, the protective jacket can comprise at least one third polymer material comprising a fluorinated polymer.

The protective jacket can further comprise a fabric screen surrounded by the protective sheath and which notably allows a reinforcement of the cable against the tensile forces that can be exerted on the optical cable.

The optical cable can further conventionally comprise a reinforcement layer placed between the central part and the protective jacket. The reinforcement layer makes it possible to reinforce the role of mechanical protection of the protective jacket.

The so-called "simplex" optical cables have a central part comprising a single optical fibre and the multifibre optical cables can comprise from 2 to 48 optical fibres. In the central part, the optical fibres can conventionally be surrounded by air, liquid or gel. In the optical cables intended for aeronautics, the optical fibres are preferably surrounded by air.

According to a preferred embodiment, the optical cable of the invention can be without any reinforcement layer. According to this embodiment, the central part is directly surrounded by the protective jacket which is therefore in direct physical contact with the central part. Preferably, the innermost layer of the protective jacket may be the fabric screen which is then in direct contact with the central part. According to a particularly preferred embodiment, the jacket can comprise only the fabric screen and the protective sheath and the fabric screen is then in direct physical contact with the central part.

The diameter d of the optical cable can have a value ranging from 0.9 mm to 6.5 mm, preferably from 0.9 mm to 5.5 mm, and particularly preferably from 0.9 mm to 3 mm. Such a diameter is optimized compared to that of the tube and the optical cable can thus be slid into the tube when it is installed and/or de-installed while avoiding any bending or twisting of the optical cable. It is thus possible to use an optical cable without reinforcement layer. In fact, the mechanical stresses on the optical cable during its installation are avoided so the reinforcement layer may not be necessary.

The values of static and/or dynamic friction coefficient between the tube and the optical cable are low, so the installation of the optical cables is facilitated and the optical cable may not have a reinforcement layer.

The protective sheath can comprise at least one third material comprising at least one third polymer chosen from among a polymer of olefin, an ethylene-propylene elastomer copolymer (EPM), an ethylene propylene diene monomer (EPDM) terpolymer, a copolymer of ethylene and of vinyl ester, a copolymer of ethylene and of acrylate, an ethylene and alpha-olefin copolymer, a fluorinated polymer, and one of the mixtures thereof, said polymers being able to be linear or branched.

According to a preferred embodiment, the third polymer material can comprise at least one fluorinated polymer chosen from copolymers obtained from among tetrafluoroethylene monomer, and in particular from among polytetrafluoro-ethylene (PTFE); the copolymers of fluorinated ethylene and propylene (FEP) such as, for example, poly(tetrafluoroethylene-co-hexafluoropropylene); the perfluoroalkoxy copolymers (PFA) such as, for example, the perfluoro(alkylvinyl-ether)/tetrafluoroethylene copolymers; the perfluoro methoxy copolymers (MFA); and poly(ethylene-co-tetrafluoroethylene) (ETFE); and one of the mixtures thereof. The fluorinated polymers notably allow the protective sheath to have a difference in static and/or dynamic friction coefficient with the inner surface of the tube that is low enough to allow the optical cables to slip easily inside the tube.

According to one embodiment, the third polymer material can conventionally comprise additional agents such as, for example, fillers, pigments, cross-linking agents, fire-proofing fillers, etc.

A second subject of the present invention is an array of optical cables comprising one or more assemblies according to the first subject of the invention.

By virtue of the features of the assembly according to the first subject of the invention, such an array offers greatly facilitated installation and maintenance.

This array comprises at least two tubes that can preferably be pre-installed on the place of use of the array and the optical cables are installed in the tubes or, on the other hand, de-installed depending on the requirements.

This array offers the advantage of comprising tubes installed in the desired place and in the desired configuration and of being able to install, de-install optical cables or even perform maintenance operations on the optical cables without needing to move the tubes. Such an array is therefore particularly useful in places where the space is limited.

A third subject of the present invention is the use of an assembly according to the first subject of the invention or of an array according to the second subject of the invention in the area of aeronautics.

In such an area, a very wide number of optical cables must be installed in reduced and cluttered spaces in which the tubes often include folds or bends.

The assembly or the array according to the invention is therefore particularly suited to this area since they make it possible for the tubes to be installed in the desired position, then for the optical cables to be installed or de-installed, or even for maintenance to be performed on the optical cables, regardless of the position of the tubes.

DETAILED DESCRIPTION

For reasons of clarity, only the elements that are essential for an understanding of the embodiments set out hereinbelow have been represented schematically, and with no respect to scale.

Figure 1:
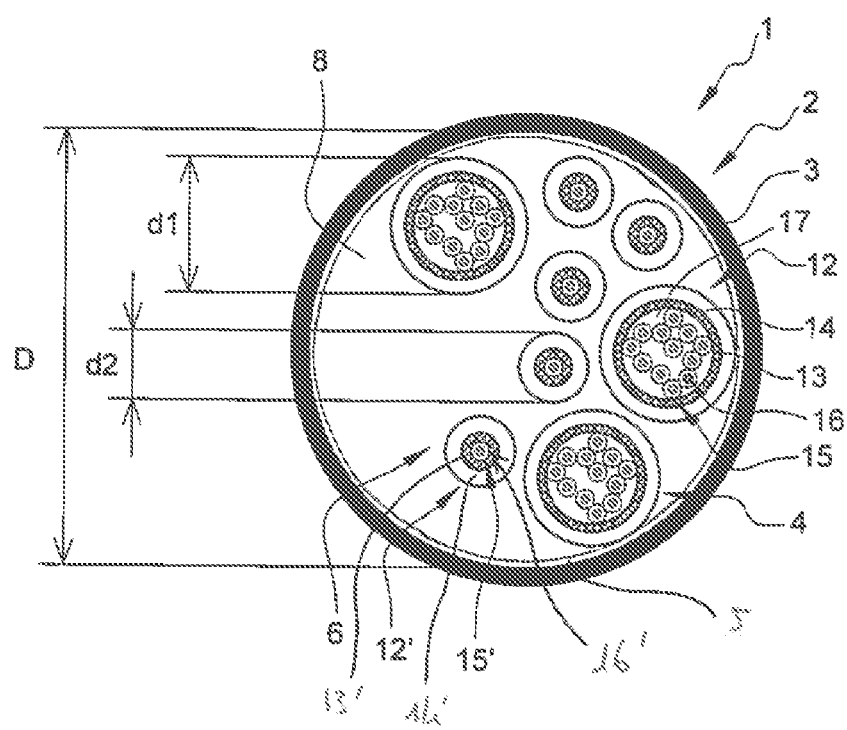
FIG. 1 represents a cross-sectional view of an assembly comprising a tube and several optical cables according to an embodiment of the invention.

According to a first embodiment illustrated in FIG. 1, an assembly 1 according to the first subject of the invention comprises a tube 2 and five so-called "simplex" optical cables 6 and three multifibre optical cables 4.

The tube 2 comprises a main layer 3 made of a first polymer material comprising a copolymer of polyetherimide siloxane, and an inner layer 5 made of a second polymer material comprising a fluorinated polymer. A space 8 between the optical cables 4 and 6 is filled with air.

The multifibre optical cables 4 comprise a protective jacket 12 surrounding the central part 15. The jacket 12 comprises a protective sheath 14 made of a third polymer material comprising a copolymer of fluorinated ethylene and propylene. The jacket 12 also comprises a fabric screen 13 placed between a central part 15 and the protective sheath 14.

The central part 15 comprises twelve optical fibres 16 which are surrounded by gel 17.

The so-called "simplex" optical cables 6 comprise a jacket 12' comprising a fabric screen 13' and a protective sheath 14' and a central part 15' comprising a single optical fibre 16'.

The tube 2 has an inner diameter D with a value of 6 mm. The multifibre optical cables 4 have an outer diameter d1 with a value of 2 mm and the simplex optical cables 6 have an outer diameter d2 with a value of 0.9 mm. The ratio d1/D is therefore 0.33 and the ratio d2/D is therefore 0.15.

Figure 2:
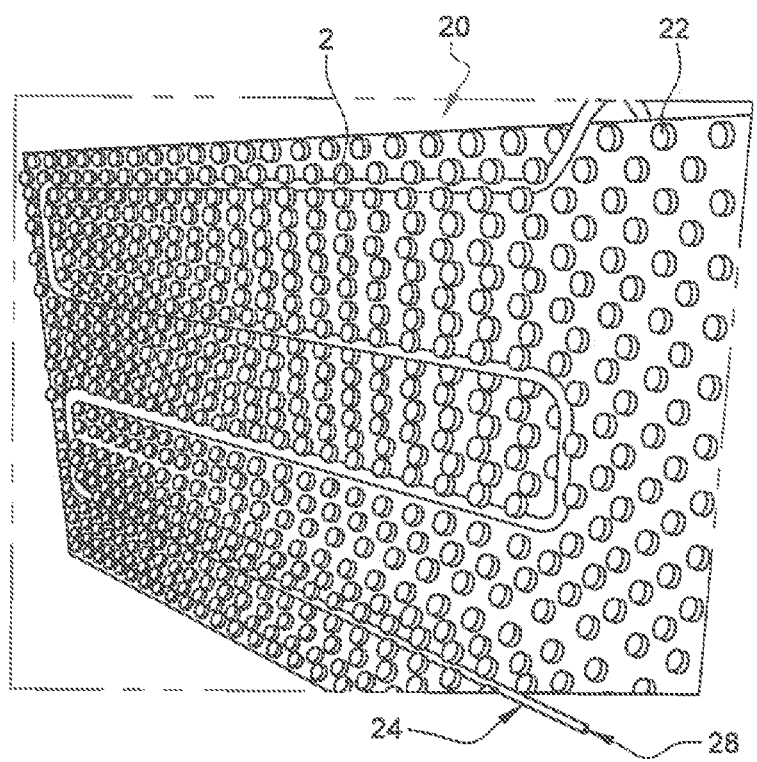
FIG. 2 represents a front view of an assembly according to the invention in which an optical cable is inserted.

FIG. 2 illustrates an array 20 comprising an assembly 24 according to a second embodiment of the invention placed on a wall 22. The assembly 24 comprises the tube 2 with a length of 25 m and a single multifibre optical cable 4 that is not visible.

The tube 2 is formed by extrusion from a polypropylene polymer.

In this exemplary embodiment, the multifibre optical cable 4 is installed in the tube 2 previously installed on the wall 22. The optical cable was able to be slid into the tube 2 from the entry 28 to a length of 15 metres, and without the optical cable being damaged.

The invention claimed is:

1. An assembly comprising:
    a tube; and
    at least one optical cable, said optical cable configured to be placed inside said tube by sliding in the said tube,
    wherein the tube has an inner diameter D and in that the optical cable has an outer diameter d, the ratio d/D ranging from 0.10 to 0.80,
    wherein the tube has a Young's modulus ranging from 450 MPa to 700 MPa,
    wherein the tube comprises a main layer comprising at least one first polymer material,
    wherein the tube comprises an inner layer comprising at least one second polymer material different from the first polymer material, said inner layer being surrounded by the main layer, and
    wherein the first polymer material comprises at least one polymer of polyimide chosen from among the polyetherimides, the polyamideimides, the copolymers of polyetherimide-siloxanes, and one of the mixtures thereof.

2. The assembly according to claim 1, wherein the tube has an inner surface having a dynamic friction coefficient $\mu d1$ and in that the optical cable has an outer surface having a dynamic friction coefficient $\mu d2$, the difference between $\mu d1$ and $\mu d2$ having an absolute value ranging from 0.05 to 0.70.

3. The assembly according to claim 1, wherein the tube has an inner surface having a static friction coefficient $\mu s1$ and in that the optical cable has an outer surface having a static friction coefficient $\mu s2$, the difference between $\mu s1$ and $\mu s2$ having an absolute value ranging from 0.05 to 0.70.

4. The assembly according to claim 1, wherein the optical cable comprises a central part comprising one or more optical fibres, the central part being surrounded by a protective jacket.

5. The Assembly according to claim 4, wherein the protective jacket comprises at least one third polymer material comprising a fluorinated polymer.

6. The assembly according to claim 4, wherein the protective jacket comprises a fabric screen and a protective sheath, the protective sheath surrounding the fabric screen.

7. An array of optical cables, wherein said array comprises one or more assemblies according to claim 1.

8. The assembly as claimed in claim 1, wherein said assembly is configured to be applied as an aeronautics assembly.

* * * * *